(12) United States Patent
Kulprathipanja et al.

(10) Patent No.: US 10,400,175 B2
(45) Date of Patent: Sep. 3, 2019

(54) APPARATUSES AND METHODS FOR CONTROLLING HEAT FOR RAPID THERMAL PROCESSING OF CARBONACEOUS MATERIAL

(75) Inventors: Sathit Kulprathipanja, Des Plaines, IL (US); Paolo Palmas, Des Plaines, IL (US)

(73) Assignee: Ensyn Renewables, Inc., Wilmington, DE (US)

( * ) Notice: Subject to any disclaimer, the term of this patent is extended or adjusted under 35 U.S.C. 154(b) by 0 days.

(21) Appl. No.: 14/346,517

(22) PCT Filed: Sep. 14, 2012

(86) PCT No.: PCT/US2012/055384
§ 371 (c)(1),
(2), (4) Date: Aug. 7, 2014

(87) PCT Pub. No.: WO2013/043485
PCT Pub. Date: Mar. 28, 2013

(65) Prior Publication Data
US 2014/0363343 A1  Dec. 11, 2014

Related U.S. Application Data

(63) Continuation of application No. 13/240,570, filed on Sep. 22, 2011, now Pat. No. 9,044,727.

(51) Int. Cl.
*C10B 53/02* (2006.01)
*B01J 8/18* (2006.01)
(Continued)

(52) U.S. Cl.
CPC ............. *C10B 53/02* (2013.01); *B01J 8/0055* (2013.01); *B01J 8/1836* (2013.01); *B01J 8/26* (2013.01);
(Continued)

(58) Field of Classification Search
CPC .............. B01J 19/00; F23R 3/00; C10B 53/02
(Continued)

(56) References Cited

U.S. PATENT DOCUMENTS

| 1,252,072 A | 1/1918 | Abbot |
| 2,205,757 A | 6/1940 | Wheat |

(Continued)

FOREIGN PATENT DOCUMENTS

| BR | 8304158 | 7/1984 |
| BR | 8304794 | 4/1985 |

(Continued)

OTHER PUBLICATIONS

FI-117512 English translation—Aug. 2012.*
(Continued)

Primary Examiner — Huy Tram Nguyen
(74) Attorney, Agent, or Firm — Jones Day

(57) ABSTRACT

Embodiments of apparatuses and methods for controlling heat for rapid thermal processing of carbonaceous material are provided herein. The apparatus comprises a reheater for containing a fluidized bubbling bed comprising an oxygen-containing gas, inorganic heat carrier particles, and char and for burning the char into ash to form heated inorganic particles. An inorganic particle cooler is in fluid communication with the reheater to receive a first portion of the heated inorganic particles. The inorganic particle cooler is configured to receive a cooling medium for indirect heat exchange with the first portion of the heated inorganic particles to form first partially-cooled heated inorganic particles that are fluidly communicated to the reheater and combined with a second portion of the heated inorganic particles to form second partially-cooled heated inorganic (Continued)

particles. A reactor is in fluid communication with the reheater to receive the second partially-cooled heated inorganic particles.

20 Claims, 3 Drawing Sheets

(51) Int. Cl.
    *B01J 8/26*         (2006.01)
    *B01J 8/32*         (2006.01)
    *B01J 8/00*         (2006.01)
    *C10B 49/22*       (2006.01)
    *F28D 7/16*        (2006.01)
    *F28F 1/14*        (2006.01)
    *F23C 10/04*       (2006.01)
    *C10C 5/00*        (2006.01)

(52) U.S. Cl.
    CPC ............... *B01J 8/32* (2013.01); *C10B 49/22* (2013.01); *F23C 10/04* (2013.01); *F28D 7/1615* (2013.01); *F28F 1/14* (2013.01); *B01J 2208/00176* (2013.01); *B01J 2208/00194* (2013.01); *B01J 2208/00292* (2013.01); *B01J 2208/00513* (2013.01); *C10C 5/00* (2013.01); *F23C 2206/103* (2013.01); *F23G 2201/304* (2013.01); *F23G 2203/502* (2013.01); *F23G 2209/26* (2013.01); *Y02E 50/14* (2013.01)

(58) Field of Classification Search
    USPC ...................................... 422/146; 432/58, 29
    See application file for complete search history.

(56) References Cited

U.S. PATENT DOCUMENTS

| | | | |
|---|---|---|---|
| 2,318,555 A * | 5/1943 | Ruthruff ..................... 510/395 |
| 2,326,525 A | 8/1943 | Diwoky |
| 2,328,202 A | 8/1943 | Doerner |
| 2,380,098 A | 7/1945 | Doerner |
| 2,492,948 A | 1/1950 | Berger |
| 2,566,353 A | 9/1951 | Mills |
| 2,696,979 A | 12/1954 | Berge |
| 2,884,303 A | 4/1959 | William |
| 2,984,602 A * | 5/1961 | Nevens ..................... C10G 1/02 201/12 |
| 3,130,007 A | 4/1964 | Breck |
| 3,309,356 A | 3/1967 | Esterer |
| 3,313,726 A | 4/1967 | Campbell et al. |
| 3,444,048 A | 5/1969 | Schmeling et al. |
| 3,445,549 A | 5/1969 | Hakulin |
| 3,467,502 A | 9/1969 | Davis |
| 3,589,313 A | 6/1971 | Smith et al. |
| 3,694,346 A | 9/1972 | Blaser et al. |
| 3,696,022 A | 10/1972 | Hutchings |
| 3,760,870 A * | 9/1973 | Guetlhuber ................. 165/103 |
| 3,776,533 A | 12/1973 | Vlnaty |
| 3,814,176 A | 6/1974 | Seth |
| 3,853,498 A | 12/1974 | Bailie |
| 3,876,533 A | 4/1975 | Myers |
| 3,890,111 A | 6/1975 | Knudsen |
| 3,907,661 A | 9/1975 | Gwyn et al. |
| 3,925,024 A | 12/1975 | Hollingsworth et al. |
| 3,927,996 A | 12/1975 | Knudsen et al. |
| 3,959,420 A | 5/1976 | Geddes et al. |
| 4,003,829 A | 1/1977 | Burger et al. |
| 4,032,305 A | 6/1977 | Squires |
| 4,039,290 A | 8/1977 | Inada et al. |
| 4,052,265 A | 10/1977 | Kemp |
| 4,064,018 A | 12/1977 | Choi |
| 4,064,043 A | 12/1977 | Kollman |
| 4,085,030 A | 4/1978 | Green et al. |
| 4,101,414 A | 7/1978 | Kim et al. |
| 4,102,773 A | 7/1978 | Green et al. |
| 4,103,902 A | 8/1978 | Steiner et al. |
| 4,138,020 A | 2/1979 | Steiner et al. |
| 4,145,274 A | 3/1979 | Green et al. |
| 4,153,514 A | 5/1979 | Garrett et al. |
| 4,157,245 A | 6/1979 | Mitchell et al. |
| 4,159,682 A | 7/1979 | Fitch |
| 4,204,915 A | 5/1980 | Kurata et al. |
| 4,219,537 A | 8/1980 | Steiner |
| 4,225,415 A | 9/1980 | Mirza et al. |
| 4,233,119 A | 11/1980 | Meyers et al. |
| 4,245,693 A | 1/1981 | Cheng |
| 4,258,005 A | 3/1981 | Ito et al. |
| 4,272,402 A | 6/1981 | Mayes |
| 4,279,207 A | 7/1981 | Wormser |
| 4,280,879 A | 7/1981 | Taciuk |
| 4,284,616 A | 8/1981 | Solbakken et al. |
| 4,298,453 A | 11/1981 | Schoennagel et al. |
| 4,300,009 A | 11/1981 | Haag et al. |
| 4,301,771 A | 11/1981 | Jukkola et al. |
| 4,306,619 A * | 12/1981 | Trojani ..................... 165/179 |
| 4,308,411 A | 12/1981 | Frankiewicz |
| 4,311,670 A | 1/1982 | Nieminen et al. |
| 4,317,703 A | 3/1982 | Bowen et al. |
| 4,321,096 A | 3/1982 | Dobbin |
| 4,324,637 A | 4/1982 | Durai-swamy |
| 4,324,641 A | 4/1982 | Durai-Swamy |
| 4,324,642 A | 4/1982 | Durai-swamy |
| 4,324,644 A | 4/1982 | Durai-swamy |
| 4,325,327 A | 4/1982 | Kantesaria et al. |
| 4,334,893 A | 6/1982 | Lang |
| 4,336,128 A | 6/1982 | Tamm |
| 4,341,598 A | 7/1982 | Green |
| 4,344,770 A | 8/1982 | Capener et al. |
| 4,364,796 A | 12/1982 | Ishii et al. |
| 4,373,994 A | 2/1983 | Lee |
| 4,422,927 A | 2/1983 | Kowalczyk |
| 4,415,434 A | 11/1983 | Hargreaves et al. |
| 4,434,726 A | 3/1984 | Jones |
| 4,443,229 A | 4/1984 | Sageman et al. |
| 4,456,504 A | 6/1984 | Spars et al. |
| 4,470,254 A | 9/1984 | Chen et al. |
| 4,482,451 A | 11/1984 | Kemp |
| 4,495,056 A | 1/1985 | Venardos et al. |
| 4,504,379 A | 3/1985 | Stuntz et al. |
| 4,524,752 A | 6/1985 | Beresford |
| 4,537,571 A * | 8/1985 | Buxel et al. .................... 432/27 |
| 4,548,615 A | 10/1985 | Longchamp et al. |
| 4,552,203 A | 11/1985 | Chrysostome et al. |
| 4,574,743 A | 3/1986 | Claus |
| 4,584,064 A | 4/1986 | Ciais et al. |
| 4,584,947 A | 4/1986 | Chittick |
| 4,595,567 A | 6/1986 | Hedrick |
| 4,597,771 A | 7/1986 | Cheng |
| 4,615,870 A | 10/1986 | Armstrong et al. |
| 4,617,693 A | 10/1986 | Meyer et al. |
| 4,645,568 A | 2/1987 | Kurps et al. |
| 4,668,243 A | 5/1987 | Schulz |
| 4,678,860 A | 7/1987 | Kuester |
| 4,684,375 A | 8/1987 | Morin et al. |
| 4,710,357 A | 12/1987 | Cetinkaya et al. |
| 4,714,109 A | 12/1987 | Tsao |
| 4,732,091 A | 3/1988 | Gould |
| 4,823,712 A | 4/1989 | Wormer |
| 4,828,581 A | 5/1989 | Feldmann et al. |
| 4,849,091 A | 7/1989 | Cabrera et al. |
| 4,880,473 A | 11/1989 | Scott et al. |
| 4,881,592 A | 11/1989 | Cetinkaya |
| 4,891,459 A | 1/1990 | Knight et al. |
| 4,897,178 A | 1/1990 | Best et al. |
| 4,931,171 A | 6/1990 | Piotter |
| 4,940,007 A | 7/1990 | Hiltunen et al. |
| 4,942,269 A | 7/1990 | Chum et al. |
| 4,968,325 A | 11/1990 | Black et al. |
| 4,983,278 A | 1/1991 | Cha et al. |
| 4,987,178 A | 1/1991 | Shibata et al. |
| 4,988,430 A | 1/1991 | Sechrist et al. |
| 4,992,605 A | 2/1991 | Craig et al. |
| 5,009,770 A | 4/1991 | Miller et al. |

(56) References Cited

U.S. PATENT DOCUMENTS

| | | | |
|---|---|---|---|
| 5,011,592 A | 4/1991 | Owen et al. | |
| 5,018,458 A | 5/1991 | Mcintyre et al. | |
| 5,041,209 A | 8/1991 | Cha et al. | |
| 5,059,404 A | 10/1991 | Mansour et al. | |
| 5,066,627 A | 11/1991 | Owen et al. | |
| 5,077,252 A | 12/1991 | Owen et al. | |
| 5,093,085 A | 3/1992 | Engstrom et al. | |
| 5,136,117 A | 8/1992 | Paisley et al. | |
| 5,151,392 A | 9/1992 | Fettis et al. | |
| 5,212,129 A | 5/1993 | Lomas | |
| 5,225,044 A | 7/1993 | Breu | |
| 5,227,566 A | 7/1993 | Cottrell et al. | |
| 5,236,688 A | 8/1993 | Watanabe et al. | |
| 5,239,946 A | 8/1993 | Garcia-mallol | |
| 5,243,922 A | 9/1993 | Rehmat et al. | |
| 5,281,727 A | 1/1994 | Carver et al. | |
| 5,306,481 A | 4/1994 | Mansour et al. | |
| 5,326,919 A | 7/1994 | Paisley et al. | |
| 5,343,939 A | 9/1994 | Cetinkaya | |
| 5,365,889 A | 11/1994 | Tang | |
| 5,371,212 A | 12/1994 | Moens | |
| 5,376,340 A | 12/1994 | Bayer et al. | |
| 5,380,916 A | 1/1995 | Rao | |
| 5,395,455 A | 3/1995 | Scott et al. | |
| 5,402,548 A | 4/1995 | Adair et al. | |
| 5,407,674 A | 4/1995 | Gabetta et al. | |
| 5,423,891 A | 6/1995 | Taylor | |
| 5,426,807 A | 6/1995 | Grimsley et al. | |
| 5,478,736 A | 12/1995 | Nair | |
| 5,494,653 A | 2/1996 | Paisley | |
| 5,520,722 A | 5/1996 | Hershkowitz et al. | |
| 5,536,488 A | 7/1996 | Mansour et al. | |
| 5,554,347 A | 9/1996 | Busson et al. | |
| 5,578,092 A | 11/1996 | Collin | |
| 5,584,985 A | 12/1996 | Lomas | |
| 5,605,551 A | 2/1997 | Scott et al. | |
| 5,637,192 A | 7/1997 | Mansour et al. | |
| 5,654,448 A | 8/1997 | Pandey et al. | |
| 5,662,050 A | 9/1997 | Angelo, II et al. | |
| 5,703,299 A | 12/1997 | Carleton et al. | |
| 5,713,977 A | 2/1998 | Kobayashi | |
| 5,725,738 A | 3/1998 | Brioni et al. | |
| 5,728,271 A | 3/1998 | Piskorz et al. | |
| 5,744,333 A | 4/1998 | Cociancich et al. | |
| 5,788,784 A | 8/1998 | Koppenhoefer et al. | |
| 5,792,340 A | 8/1998 | Freel et al. | |
| 5,797,332 A * | 8/1998 | Keller .................. | F23G 5/027 110/216 |
| 5,853,548 A | 12/1998 | Piskorz et al. | |
| 5,879,079 A | 3/1999 | Hohmann et al. | |
| 5,879,642 A | 3/1999 | Trimble et al. | |
| 5,879,650 A | 3/1999 | Kaul et al. | |
| 5,904,838 A | 5/1999 | Kalnes et al. | |
| 5,915,311 A | 6/1999 | Muller et al. | |
| 5,961,786 A * | 10/1999 | Freel ..................... | C10B 49/20 201/12 |
| 5,969,165 A | 10/1999 | Liu | |
| 6,002,025 A | 12/1999 | Page et al. | |
| 6,011,187 A | 1/2000 | Hirotoshi et al. | |
| 6,033,555 A | 3/2000 | Chen et al. | |
| 6,106,702 A | 8/2000 | Sohn et al. | |
| 6,113,862 A | 9/2000 | Jorgensen et al. | |
| 6,123,833 A | 9/2000 | Sechrist et al. | |
| 6,133,328 A * | 10/2000 | Lightner ............... | C07C 29/1518 252/373 |
| 6,133,499 A | 10/2000 | Horizoe et al. | |
| 6,149,765 A | 11/2000 | Mansour et al. | |
| 6,190,542 B1 | 2/2001 | Comolli et al. | |
| 6,193,837 B1 | 2/2001 | Agblevor et al. | |
| 6,237,541 B1 | 5/2001 | Alliston et al. | |
| 6,286,443 B1 | 9/2001 | Fujinami et al. | |
| 6,339,182 B1 | 1/2002 | Munson et al. | |
| 6,390,185 B1 | 5/2002 | Proeschel | |
| 6,398,921 B1 | 6/2002 | Moraski | |
| 6,452,024 B1 | 9/2002 | Bui-Khac et al. | |
| 6,455,015 B1 | 9/2002 | Kilroy | |
| 6,485,841 B1 | 11/2002 | Freel et al. | |
| 6,497,199 B2 * | 12/2002 | Yamada et al. ............ | 122/367.1 |
| 6,547,957 B1 | 4/2003 | Sudhakar et al. | |
| 6,555,649 B2 | 4/2003 | Giroux et al. | |
| 6,656,342 B2 | 12/2003 | Smith et al. | |
| 6,660,157 B2 | 12/2003 | Que et al. | |
| 6,676,828 B1 | 1/2004 | Galiasso et al. | |
| 6,680,137 B2 | 1/2004 | Paisley et al. | |
| 6,743,746 B1 | 6/2004 | Prilutsky et al. | |
| 6,759,562 B2 | 7/2004 | Gartside et al. | |
| 6,776,607 B2 | 8/2004 | Nahas et al. | |
| 6,808,390 B1 | 10/2004 | Fung | |
| 6,814,940 B1 | 11/2004 | Hiltunen et al. | |
| 6,844,420 B1 | 1/2005 | Freel et al. | |
| 6,875,341 B1 | 4/2005 | Bunger et al. | |
| 6,960,325 B2 | 11/2005 | Kao et al. | |
| 6,962,676 B1 | 11/2005 | Hyppaenen | |
| 6,988,453 B2 | 1/2006 | Cole et al. | |
| 7,004,999 B2 | 2/2006 | Johnson et al. | |
| 7,022,741 B2 | 4/2006 | Jiang et al. | |
| 7,026,262 B1 | 4/2006 | Palmas et al. | |
| 7,202,389 B1 | 4/2007 | Brem | |
| 7,214,252 B1 | 5/2007 | Krumm et al. | |
| 7,226,954 B2 | 6/2007 | Tavasoli et al. | |
| 7,240,639 B2 | 7/2007 | Hyppaenen et al. | |
| 7,247,233 B1 | 7/2007 | Hedrick et al. | |
| 7,262,331 B2 | 8/2007 | van de Beld et al. | |
| 7,263,934 B2 | 9/2007 | Copeland et al. | |
| 7,285,186 B2 | 10/2007 | Tokarz | |
| 7,319,168 B2 | 1/2008 | Sanada | |
| 7,473,349 B2 | 1/2009 | Keckler et al. | |
| 7,476,774 B2 | 1/2009 | Umansky et al. | |
| 7,479,217 B2 | 1/2009 | Pinault et al. | |
| 7,491,317 B2 | 2/2009 | Meier et al. | |
| 7,563,345 B2 | 7/2009 | Tokarz | |
| 7,572,362 B2 | 8/2009 | Freel et al. | |
| 7,572,365 B2 | 8/2009 | Freel et al. | |
| 7,578,927 B2 | 8/2009 | Marker et al. | |
| 7,625,432 B2 | 12/2009 | Gouman et al. | |
| 7,811,340 B2 | 10/2010 | Bayle et al. | |
| 7,897,124 B2 | 3/2011 | Gunnerman et al. | |
| 7,905,990 B2 | 3/2011 | Freel | |
| 7,943,014 B2 | 5/2011 | Berruti et al. | |
| 7,956,224 B2 | 6/2011 | Elliott et al. | |
| 7,960,598 B2 | 6/2011 | Spilker et al. | |
| 7,982,075 B2 | 7/2011 | Marker et al. | |
| 7,998,315 B2 | 8/2011 | Bridgwater et al. | |
| 7,998,455 B2 | 8/2011 | Abbas et al. | |
| 7,999,142 B2 | 8/2011 | Kalnes et al. | |
| 7,999,143 B2 | 8/2011 | Marker et al. | |
| 8,043,391 B2 | 10/2011 | Dinjus et al. | |
| 8,057,641 B2 | 11/2011 | Bartek et al. | |
| 8,097,090 B2 | 1/2012 | Freel et al. | |
| 8,097,216 B2 | 1/2012 | Beech et al. | |
| 8,147,766 B2 | 4/2012 | Spilker et al. | |
| 8,153,850 B2 | 4/2012 | Hall et al. | |
| 8,202,332 B2 | 6/2012 | Agblevor | |
| 8,207,385 B2 | 6/2012 | O'Connor et al. | |
| 8,217,211 B2 | 7/2012 | Agrawal et al. | |
| 8,277,643 B2 | 10/2012 | Huber et al. | |
| 8,288,600 B2 | 10/2012 | Bartek et al. | |
| 8,304,592 B2 | 11/2012 | Luebke | |
| 8,314,275 B2 | 11/2012 | Brandvold | |
| 8,329,967 B2 | 12/2012 | Brandvold et al. | |
| 8,404,910 B2 | 3/2013 | Kocal et al. | |
| 8,499,702 B2 | 8/2013 | Palmas et al. | |
| 8,519,203 B2 | 8/2013 | Marinangeli et al. | |
| 8,519,205 B2 | 8/2013 | Frey et al. | |
| 8,524,087 B2 | 9/2013 | Frey et al. | |
| 8,575,408 B2 | 11/2013 | Marker et al. | |
| 8,715,490 B2 | 5/2014 | Brandvold et al. | |
| 8,726,443 B2 | 5/2014 | Freel et al. | |
| 8,961,743 B2 | 2/2015 | Freel | |
| 9,044,727 B2 * | 6/2015 | Kulprathipanja et al. | |
| 2002/0014033 A1 | 2/2002 | Langer et al. | |
| 2002/0100711 A1 | 8/2002 | Freel et al. | |
| 2002/0146358 A1 | 10/2002 | Smith et al. | |
| 2003/0049854 A1 | 3/2003 | Rhodes | |

(56) References Cited

U.S. PATENT DOCUMENTS

| | | |
|---|---|---|
| 2003/0202912 A1 | 10/2003 | Myohanen et al. |
| 2004/0069682 A1 | 4/2004 | Freel et al. |
| 2004/0182003 A1 | 9/2004 | Bayle et al. |
| 2004/0200204 A1 | 10/2004 | Dries et al. |
| 2005/0167337 A1 | 8/2005 | Bunger et al. |
| 2005/0209328 A1 | 9/2005 | Allgcod et al. |
| 2006/0010714 A1 | 1/2006 | Carin et al. |
| 2006/0016723 A1 | 1/2006 | Tang et al. |
| 2006/0070362 A1 | 4/2006 | Dewitz et al. |
| 2006/0074254 A1 | 4/2006 | Zhang et al. |
| 2006/0101665 A1 | 5/2006 | Carin et al. |
| 2006/0112639 A1 | 6/2006 | Nick et al. |
| 2006/0130719 A1 | 6/2006 | Morin et al. |
| 2006/0163053 A1 | 7/2006 | Ershag |
| 2006/0180060 A1 | 8/2006 | Crafton et al. |
| 2006/0185245 A1 | 8/2006 | Serio et al. |
| 2006/0201024 A1 | 9/2006 | Carin et al. |
| 2006/0254081 A1 | 11/2006 | Carin et al. |
| 2006/0264684 A1 | 11/2006 | Petri et al. |
| 2007/0000809 A1 | 1/2007 | Tzong-bin et al. |
| 2007/0006528 A1* | 1/2007 | Diebold .............. B01D 29/27 48/197 R |
| 2007/0010588 A1 | 1/2007 | Pearson |
| 2007/0141222 A1 | 6/2007 | Binder et al. |
| 2007/0205139 A1 | 9/2007 | Kulprathipanja et al. |
| 2007/0272538 A1 | 11/2007 | Satchell |
| 2008/0006519 A1 | 1/2008 | Badger |
| 2008/0006520 A1 | 1/2008 | Badger |
| 2008/0029437 A1 | 2/2008 | Umansky et al. |
| 2008/0035526 A1 | 2/2008 | Hedrick et al. |
| 2008/0035528 A1 | 2/2008 | Marker |
| 2008/0050792 A1 | 2/2008 | Zmierczak et al. |
| 2008/0051619 A1 | 2/2008 | Kulprathipanja et al. |
| 2008/0081006 A1 | 4/2008 | Myers et al. |
| 2008/0086937 A1 | 4/2008 | Hazlebeck et al. |
| 2008/0161615 A1 | 7/2008 | Chapus et al. |
| 2008/0171649 A1 | 7/2008 | Jan et al. |
| 2008/0185112 A1 | 8/2008 | Argyropoulos |
| 2008/0189979 A1 | 8/2008 | Carin et al. |
| 2008/0193345 A1 | 8/2008 | Lott et al. |
| 2008/0194896 A1 | 8/2008 | Brown et al. |
| 2008/0199821 A1 | 8/2008 | Nyberg et al. |
| 2008/0230440 A1 | 9/2008 | Graham et al. |
| 2008/0236043 A1 | 10/2008 | Dinjus et al. |
| 2008/0264771 A1 | 10/2008 | Dam-Johansen et al. |
| 2008/0274017 A1 | 11/2008 | Boykin et al. |
| 2008/0274022 A1 | 11/2008 | Boykin et al. |
| 2008/0282606 A1 | 11/2008 | Plaza et al. |
| 2008/0312476 A1 | 12/2008 | McCall |
| 2008/0318763 A1 | 12/2008 | Anderson |
| 2009/0008292 A1 | 1/2009 | Keusenkothen et al. |
| 2009/0008296 A1 | 1/2009 | Sappok et al. |
| 2009/0077867 A1 | 3/2009 | Marker et al. |
| 2009/0077868 A1 | 3/2009 | Brady et al. |
| 2009/0078557 A1 | 3/2009 | Tokarz |
| 2009/0078611 A1 | 3/2009 | Marker et al. |
| 2009/0082603 A1 | 3/2009 | Kalnes et al. |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |
| 2009/0090058 A1 | 4/2009 | Dam-Johansen et al. |
| 2009/0113787 A1 | 5/2009 | Elliott et al. |
| 2009/0139851 A1 | 6/2009 | Freel |
| 2009/0165378 A1 | 7/2009 | Agblevor |
| 2009/0183424 A1 | 7/2009 | Gorbell et al. |
| 2009/0188158 A1 | 7/2009 | Morgan |
| 2009/0193709 A1 | 8/2009 | Marker et al. |
| 2009/0208402 A1 | 8/2009 | Rossi |
| 2009/0227823 A1 | 9/2009 | Huber et al. |
| 2009/0242377 A1 | 10/2009 | Honkola et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0255144 A1 | 10/2009 | Gorbell et al. |
| 2009/0259076 A1 | 10/2009 | Simmons et al. |
| 2009/0259082 A1 | 10/2009 | Deluga et al. |
| 2009/0274600 A1 | 11/2009 | Jain et al. |
| 2009/0283442 A1 | 11/2009 | McCall et al. |
| 2009/0287029 A1 | 11/2009 | Anumakonda et al. |
| 2009/0293344 A1 | 12/2009 | O'Brien et al. |
| 2009/0293359 A1 | 12/2009 | Simmons et al. |
| 2009/0294324 A1 | 12/2009 | Brandvold et al. |
| 2009/0301930 A1 | 12/2009 | Brandvold et al. |
| 2009/0308787 A1 | 12/2009 | O'Connor et al. |
| 2009/0318737 A1 | 12/2009 | Luebke |
| 2009/0321311 A1 | 12/2009 | Marker et al. |
| 2010/0043634 A1 | 2/2010 | Shulfer et al. |
| 2010/0083566 A1 | 4/2010 | Frederiksen et al. |
| 2010/0133144 A1 | 6/2010 | Kokayeff et al. |
| 2010/0147743 A1 | 6/2010 | MacArthur et al. |
| 2010/0151550 A1 | 6/2010 | Nunez et al. |
| 2010/0158767 A1 | 6/2010 | Mehlberg et al. |
| 2010/0148122 A1 | 7/2010 | Breton et al. |
| 2010/0162625 A1* | 7/2010 | Mills .................... C10J 3/485 48/76 |
| 2010/0163395 A1 | 7/2010 | Henrich et al. |
| 2010/0222620 A1 | 9/2010 | O'Connor et al. |
| 2010/0266464 A1* | 10/2010 | Sipila et al. ............ 422/187 |
| 2010/0325954 A1 | 12/2010 | Tiwari et al. |
| 2011/0017443 A1 | 1/2011 | Collins |
| 2011/0067438 A1* | 3/2011 | Bernasconi ............ 62/603 |
| 2011/0068585 A1 | 3/2011 | Dube et al. |
| 2011/0110849 A1 | 5/2011 | Siemons |
| 2011/0113675 A1 | 5/2011 | Fujiyama et al. |
| 2011/0123407 A1 | 5/2011 | Freel |
| 2011/0132737 A1 | 6/2011 | Jadhav |
| 2011/0139597 A1 | 6/2011 | Lin |
| 2011/0146135 A1 | 6/2011 | Brandvold |
| 2011/0146140 A1 | 6/2011 | Brandvold et al. |
| 2011/0146141 A1 | 6/2011 | Frey et al. |
| 2011/0146145 A1 | 6/2011 | Brandvold et al. |
| 2011/0160505 A1 | 6/2011 | McCall |
| 2011/0182778 A1 | 7/2011 | Breton et al. |
| 2011/0201854 A1 | 8/2011 | Kocal et al. |
| 2011/0224471 A1 | 9/2011 | Wormsbecher et al. |
| 2011/0239530 A1 | 10/2011 | Marinangeli et al. |
| 2011/0253600 A1 | 10/2011 | Niccum |
| 2011/0258914 A1 | 10/2011 | Banasiak et al. |
| 2011/0278149 A1 | 11/2011 | Hornung et al. |
| 2011/0284359 A1 | 11/2011 | Sechrist et al. |
| 2012/0012039 A1 | 1/2012 | Palmas et al. |
| 2012/0017493 A1 | 1/2012 | Taynor et al. |
| 2012/0022171 A1 | 1/2012 | Frey |
| 2012/0023809 A1 | 2/2012 | Koch et al. |
| 2012/0047794 A1 | 3/2012 | Bartek et al. |
| 2012/0073185 A1 | 3/2012 | Jokela et al. |
| 2012/0137939 A1 | 6/2012 | Kulprathipanja |
| 2012/0160741 A1 | 6/2012 | Gong et al. |
| 2012/0167454 A1 | 7/2012 | Brandvold et al. |
| 2012/0172622 A1 | 7/2012 | Kocal |
| 2012/0193581 A1 | 8/2012 | Goetsch et al. |
| 2012/0205289 A1 | 8/2012 | Joshi |
| 2012/0214113 A1* | 8/2012 | Kulprathipanja et al. ...... 432/18 |
| 2012/0214114 A1 | 8/2012 | Kim et al. |
| 2012/0216448 A1 | 8/2012 | Ramirez Coredores et al. |
| 2012/0279825 A1 | 11/2012 | Freel et al. |
| 2012/0317871 A1 | 12/2012 | Frey et al. |
| 2013/0029168 A1 | 1/2013 | Trewella et al. |
| 2013/0062184 A1 | 3/2013 | Kulprathipanja et al. |
| 2013/0067803 A1 | 3/2013 | Kalakkunnath et al. |
| 2013/0075072 A1 | 3/2013 | Kulprathipanja et al. |
| 2013/0078581 A1* | 3/2013 | Kulprathipanja et al. ........ 431/2 |
| 2013/0212930 A1 | 3/2013 | Naae et al. |
| 2013/0105356 A1 | 5/2013 | Dijs et al. |
| 2013/0109765 A1 | 5/2013 | Jiang et al. |
| 2013/0118059 A1 | 5/2013 | Lange et al. |
| 2013/0150637 A1 | 6/2013 | Borremans et al. |
| 2013/0152453 A1 | 6/2013 | Baird et al. |
| 2013/0152454 A1 | 6/2013 | Baird et al. |
| 2013/0152455 A1 | 6/2013 | Baird et al. |
| 2013/0195727 A1 | 8/2013 | Bull et al. |
| 2013/0267743 A1 | 10/2013 | Brandvold et al. |
| 2014/0001026 A1 | 1/2014 | Baird et al. |

(56) References Cited

U.S. PATENT DOCUMENTS

| | | |
|---|---|---|
| 2014/0140895 A1 | 5/2014 | Davydov et al. |
| 2014/0142362 A1 | 5/2014 | Davydov et al. |
| 2014/0230725 A1 | 8/2014 | Holler et al. |

FOREIGN PATENT DOCUMENTS

| | | | |
|---|---|---|---|
| CA | 1312497 | 1/1993 | |
| CA | 2091373 | 9/1997 | |
| CA | 2299149 | 12/2000 | |
| CA | 2521829 | 3/2006 | |
| CN | 1377938 | 11/2002 | |
| CN | 1730177 | 2/2006 | |
| CN | 101045524 | 10/2007 | |
| CN | 101238197 | 8/2008 | |
| CN | 101294085 | 10/2008 | |
| CN | 101318622 | 12/2008 | |
| CN | 101353582 | 1/2009 | |
| CN | 101365770 | 2/2009 | |
| CN | 101381611 | 3/2009 | |
| CN | 101544901 | 9/2009 | |
| CN | 101550347 | 10/2009 | |
| CN | 101745349 | 6/2010 | |
| CN | 101993712 | 3/2011 | |
| EP | 105980 | 1/1986 | |
| EP | 578503 | 1/1994 | |
| EP | 676023 | 7/1998 | |
| EP | 718392 | 9/1999 | |
| EP | 787946 | 6/2000 | |
| EP | 1420058 | 5/2004 | |
| FI | 117512 B * | 8/1999 | ............ C10B 49/22 |
| FI | 117512 | 11/2005 | |
| FR | 879606 | 3/1943 | |
| GB | 1019133 | 2/1966 | |
| GB | 1300966 | 12/1972 | |
| JP | 58150793 | 9/1983 | |
| JP | 1277196 | 11/1989 | |
| JP | 11148625 | 6/1999 | |
| JP | 2001/131560 | 5/2001 | |
| JP | 2007/229548 | 9/2007 | |
| SE | 9903742-6 | 1/2004 | |
| WO | 1991/11499 | 8/1991 | |
| WO | 1992/07842 | 5/1992 | |
| WO | 1992/18492 | 10/1992 | |
| WO | 1994/13827 | 6/1994 | |
| WO | 1997/044410 | 11/1997 | |
| WO | 2001/009243 | 2/2001 | |
| WO | 2001/83645 | 11/2001 | |
| WO | 2006/071109 | 7/2006 | |
| WO | 2007/017005 | 2/2007 | |
| WO | 2007/045093 | 4/2007 | |
| WO | 2007/050030 | 5/2007 | |
| WO | 2007/128798 | 11/2007 | |
| WO | 2008/009643 | 1/2008 | |
| WO | 2008/020167 | 2/2008 | |
| WO | 2008/092557 | 8/2008 | |
| WO | 2009/019520 | 2/2009 | |
| WO | 2009/047387 | 4/2009 | |
| WO | 2009/047392 | 4/2009 | |
| WO | 2009/067350 | 5/2009 | |
| WO | 2009/099684 | 8/2009 | |
| WO | 2009/118357 | 10/2009 | |
| WO | 2009/118363 | 10/2009 | |
| WO | 2009/126508 | 10/2009 | |
| WO | 2010/002792 | 1/2010 | |
| WO | 2011/146262 | 11/2011 | |
| WO | 2012/009207 | 1/2012 | |
| WO | 2012/012260 | 1/2012 | |
| WO | 2012/078422 | 6/2012 | |
| WO | 2012/088546 | 6/2012 | |
| WO | 2012/115754 | 8/2012 | |
| WO | 2013/043485 | 3/2013 | |

OTHER PUBLICATIONS

AccessScience Dictionary, "ebullating-bed reactor," http://www.accessscience.com, last visited Jul. 15, 2014.

Adam, J. "Catalytic conversion of biomass to produce higher quality liquid bio-fuels," *PhD Thesis*, Department of Energy and Process Engineering, The Norwegian University of Science and Technology, Trondheim (2005).

Adam, J. et al. "Pyrolysis of biomass in the presence of AI-MCM-41 type catalysts," *Fuel*, 84 (2005) 1494-1502.

Adjaye, John D. et al. "Catalytic conversion of a biomass-derived oil to fuels and chemicals I: Model compound studies and reaction pathways," *Biomass & Bioenergy*, 8:3 (1995) 131-149.

Adjaye, John D. et al. "Catalytic conversion of a biomass-derived oil to fuels and chemicals II: Chemical kinetics, parameter estimation and model predictions," *Biomass & Bioenergy*, 8:4 (1995) 265-277.

Adjaye, John D. et al. "Catalytic conversion of wood derived bio-oil to fuels and chemicals," *Studies in Surface Science and Catalysis*, 73 (1992) 301-308.

Adjaye, John D. et al. "Production of hydrocarbons by the catalytic upgrading of a fast pyrolysis bio-oil," *Fuel Process Technol*, 45:3 (1995) 161-183.

Adjaye, John D. et al. "Upgrading of a wood-derived oil over various catalysts," *Biomass & Bioenergy*, 7:1-6 (1994) 201-211.

Aho, A. et al. "Catalytic pyrolysis of woody biomass in a fluidized bed reactor; Influence of zeolites structure, Science Direct," *Fuel*, 87 (2008) 2493-2501.

Antonakou, E. et al. "Evaluation of various types of AI-MCM-41 materials as catalysts in biomass pyrolysis for the production of bio-fuels and chemicals," *Fuel*, 85 (2006) 2202-2212.

Atutxa, A. et al. "Kinetic Description of the Catalytic Pyrolysis of Biomass in a Conical Spouted Bed Reactor," *Energy Fuels*, 19:3 (2005) 765-774.

Baker, E. G. et al. "Catalytic Upgrading of Biomass Pyrolysis Oils," in Bridgwater, A. V. et al. (eds) *Research in Thermochemical Biomass Conversion*, Elsevier Science Publishers Ltd., Barking, England (1988) 883-895.

Baldauf, W. et al. "Upgrading of flash pyrolysis oil and utilization in refineries," *Biomass & Bioenergy*, 7 (1994) 237-244.

Baumlin, "The continuous self stirred tank reactor: measurement of the cracking kinetics of biomass pyrolysis vapours," *Chemical Engineering Science*, 60 (2005) 41-55.

Berg, "Reactor Development for the Ultrapyrolysis Process," *The Canadian Journal of Chemical Engineering*, 67 (1989) 96-101.

Bielansky, P. et al. "Catalytic conversion of vegetable oils in a continuous FCC pilot plant," *Fuel Processing Technology*, 92 (2011) 2305-2311.

Bimbela, F. et al. "Hydrogen production by catalytic steam reforming of acetic acid, a model compound of biomass pyrolysis liquids," *J. Ana App. Pyrolysis*, 79 (2007) 112-120.

Bridgwater et al. (eds) *Fast Pyrolysis of Biomass: A Handbook*, Newbury Cpl Press, Great Britain (2002) 12-13.

Bridgwater, A.V. "Principles and practices of biomass fast pyrolysis processes for liquids," *Journal of Analytical and Applied Pyrolysis*, 51 (1999) 3-22.

Bridgwater, Tony "Production of high grade fuels and chemicals from catalytic pyrolysis of biomass," *Catalysis Today*, 29 (1996) 285-295.

Bridgwater, Tony et al. "Transport fuels from biomass by thermal processing," *EU-China Workshop on Liquid Biofuels*, Beijing, China (Nov. 4-5, 2004).

Buchsbaum, A. et al. "The Challenge of the Biofuels Directive for a European Refinery," *OMW Refining and Marketing, ERTC 9th Annual Meeting*, Prague, Czech Republic (Nov. 15-17, 2004).

Carlson, T. et al. "Aromatic Production from Catalytic Fast Pyrolysis of Biomass-Derived Feedstocks," *Top Catal*, 52 (2009) 241-242.

Carlson., T. et al. "Green Gasoline by Catalytic Fast Pyrolysis of Solid Biomass Derived Compounds," *ChemSusChem*, 1 (2008) 397-400.

Cass et al. "Challenges in the Isolation of Taxanes from *Taxus canadensis* by Fast Pyrolysis," *J Analytical and Applied Pyrolysis* 57 (2001) 275-285.

(56) References Cited

OTHER PUBLICATIONS

Chantal, P. D. et al. "Production of Hydrocarbons from Aspen Poplar Pyrolytic Oils over H-ZSM5," *Applied Catalysis*, 10 (1984) 317-332.

Chen, N. Y. et al. "Fluidized Upgrading of Wood Pyrolysis Liquids and Related Compounds," in Soltes, E. J. et al. (eds) *Pyrolysis Oils from Biomass*, ACS, Washington, DC (1988) 277-289.

Chinsuwan, A. et al. "An experimental investigation of the effect of longitudinal fin orientation on heat transfer in membrane water wall tubes in a circulating fluidized bed," *International Journal of Heat and Mass Transfer*, 52:5-6 (2009) 1552-1560.

Cornelissen, T. et al., "Flash co-pyrolysis of biomass with polylactic acid. Part 1: Influence on bio-oil yield and heating value," *Fuel* 87 (2008) 1031-1041.

Cousins, A. et al. "Development of a bench-scale high-pressure fluidized bed reactor and its sequential modification for studying diverse aspects of pyrolysis and gasification of coal and biomass," *Energy and Fuels*, 22:4 (2008) 2491-2503.

Cragg et al. "The Search for New Pharmaceutical Crops: Drug Discovery and Development at the National Cancer Institute," in Janick, J. and Simon, J.E. (eds) *New Crops*, Wiley, New York (1993) 161-167.

Czernik, S. et al. "Hydrogen from biomass-production by steam reforming of biomass pyrolysis oil," *Catalysis Today*, 129 (2007) 265-168.

Czernik, S. et al. "Hydrogren by Catalytic Steam Reforming of Liquid Byproducts from Biomass Thermoconversion Processes," *Ind. Eng. Chern. Res.*, 41 (2002) 4209-4215.

Dahmen, "Rapid pyrolysis for the pretreatment of biomass and generation of bioslurry as intermediate fuel", *Chemie-Ingenieur-Technik*, 79:9 (2007) 1326-1327. Language: German (Abstract only; Machine translation of Abstract).

Dandik, "Catalytic Conversion of Used Oil to Hydrocarbon Fuels in a Fractionating Pyrolysis Reactor," *Energy & Fuels*, 12 (1998) 1148-1152.

Daoust et al. "Canada Yew (*Taxus canadensis* Marsh.) and Taxanes: a Perfect Species for Field Production and Improvement through Genetic Selection," Natural Resources Canada, Canadian Forest Service, Sainte-Foy, Quebec (2003).

De Wild, P. et al. "Lignin valorisation for chemicals and (transportation) fuels via (catalytic) pyrolysis and hydrodeoxygenation," *Environ. Prog. Sustainable Energy*, 28 (2009) 461-469.

Demirbas, Ayhan "Fuel Conversional Aspects of Palm Oil and Sunflower Oil," *Energy Sources*, 25 (2003) 457-466.

Di Blasi, C. et al. "Effects of Potassium Hydroxide Impregnation of Wood Pyrolysis, American Chemical Society," *Energy & Fuels* 23 (2009) 1045-1054.

Ellioti, D. "Historical Developments in Hydroprocessing Bio-oils," *Energy & Fuels*, 21 (2007) 1792-1815.

Ensyn Technologies Inc. "Catalytic de-oxygenation of biomass-derived RTP vapors." Prepared for ARUSIA, Agenzia Regionale Umbria per lo Sviluppo e L'Innovazione, Perugia, Italy (Mar. 1997).

Filtration, Kirk-Othmer Encyclopedia of Chemical Technology 5th Edition. vol. 11., John Wiley & Sons, Inc., Feb. 2005.

Gayubo, A. G. et al. "Deactivation of a HZSM-5 Zeolite Catalyst in the Transformation of the Aqueous Fraction of Biomass Pyrolysis Oil into Hydrocarbons," *Energy & Fuels*, 18:6 (2004) 1640-1647.

Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.

Gevert, Börjie S. et al. "Upgrading of directly liquefied biomass to transportation fuels: catalytic cracking," *Biomass* 14:3 (1987) 173-183.

Goesele, W. et al., Filtration, Wiley-VCHVerlag GmbH & Co. KGaA, Weinheim, 10.1002/14356007.b02 10, 2005.

Grange, P. et al. "Hydrotreatment of pyrolysis oils from biomass: reactivity of the various categories of oxygenated compounds and preliminary techno-economical study," *Catalysis Today*, 29 (1996) 297-301.

Hama, "Biodiesel-fuel production in a packed-bed reactor using lipase-producing Rhizopus oryzae cells immobilized within biomass support particles", *Biochemical Engineering Journal*, 34 (2007) 273-278.

Hoekstra, E. et al., "Fast Pyrolysis of Biomass in a Fluidized Bed Reactor: In Situ Filtering of the Vapors," *Ind. Eng. Chern. Res.*, 48:10 (2009) 4744-4756.

Holton et al. "First Total Synthesis of Taxol. 2. Completion of the C and D Rings," *J Am Chem Soc*, 116 (1994) 1599-1600.

Horne, Patrick A. et al. "Catalytic coprocessing of biomass-derived pyrolysis vapours and methanol," *J. Analytical and Applied Pyrolysis*, 34:1 (1995) 87-108.

Horne, Patrick A. et al. "Premium quality fuels and chemicals from the fluidised bed pyrolysis of biomass with zeolite catalyst upgrading," *Renewable Energy*, 5:5-8 (1994) 810-812.

Horne, Patrick A. et al. "The effect of zeolite ZSM-5 catalyst deactivation during the upgrading of biomass-derived pyrolysis vapours," *J Analytical and Applied Pyrolysis*, 34:1 (1995) 65-85.

Huang et al. "New Taxanes from *Taxus brevifolia*," *J of Natural Products*, 49 (1986) 665-669.

Huffman, D. R. et al., Ensyn Technologies Inc., "Thermo-Catalytic Cracking of Wood to Transportation Fuels," DSS Contract No. 38SQ.23440-4-1429, Efficiency and Alternative Energy Technology Branch, Natural Resources Canada, Ottawa, Canada (1997).

Huffman, D. R., Ensyn Technologies Inc., "Thermo-catalytic cracking of wood to transportation fuels using the RTP process, DSS Contract No. 38SQ.23440-4-1429," Efficiency and Alternative Energy Technology Branch, Natural Resources Canada, Ottawa, Ontario (Jan. 1997).

Hughes, J. et al. "Structural variations in natural F, OH and Cl apatites," *American Mineralogist*, 74 (1989) 870-876.

Huie, C. W. "A review of modern sample-preparation techniques for the extraction and analysis of medicinal plants," *Anal Bioanal Chem*, 373 (2002) 23-30.

International Search Report dated Feb. 22, 2013 for corresponding International Application No. PCT/US2012/68876.

Ioannidou, "Investigating the potential for energy, fuel, materials and chemicals production from corn residues (cobs and stalks) by non-catalytic and catalytic pyrolysis in two reactor configurations," *Renewable and Sustainable Energy Reviews*, 13 (2009) 750-762.

Iojoiu, E. et al. "Hydrogen production by sequential cracking of biomass-derived pyrolysis oil over noble metal catalysts supported on ceria-zirconia," *Applied Catalysis A: General*, 323 (2007) 147-161.

Jackson, M. et al. "Screening heterogenous catalysts for the pyrolysis of lignin," *J. Anal. Appl. Pyrolysis*, 85 (2009) 226-230.

Junming et al. "Bio-oil upgrading by means of ethyl ester production in reactive distillation to remove water and to improve storage and fuel characteristics," *Biomass and Energy*, 32 (2008) 1056-1061.

Kalnes, Tom et al. "Feedstock Diversity in the Refining Industry," UOP Report to NREL and DOE (2004).

Khanal, "Biohydrogen Production in Continuous-Flow Reactor Using Mixed Microbial Culture," *Water Environment Research*, 78:2 (2006) 110-117.

Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.

Kingston et al. "New Taxanes from *Taxus brevifolia*," *J of Natural Products*, 45 (1982) 466-470.

Lappas, A. A. et al. "Biomass pyrolysis in a circulating fluid bed reactor for the production of fuels and chemicals," *Fuel*, 81 (2002) 2087-2095.

Lappas, A.A. et al. "Production of Transportation Fuels from Biomass," *Workshop of Chemical Process Engineering Research Institute/Center for Research and Technology Hellas*, Thermi-Thessaloniki, Greece (2004).

Lappas, A.A., "Production of biofuels via co-processing in conventional refining process," *Catalysis Today*, 145 (2009) 55-62.

Maiti, R.N. et al. "Gas-liquid distributors for trickle-bed reactors: A review"; *Industrial and Engineering Chemistry Research*, 46:19 (2007) 6164-6182.

(56) References Cited

OTHER PUBLICATIONS

Mancosky, "The use of a controlled cavitation reactor for bio-diesel production," (abstract only), AIChE Spring National Meeting 2007, Houston, Texas.
Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).
Marker, Terry L., et al., UOP, "Opportunities for Biorenewables in Oil Refineries," Final Technical Report, U.S. Department of Energy Award No. DE-FG36-05G015085, Report No. DOEGO15085Final (2005).
Marquevich, "Hydrogen from Biomass: Steam Reforming of Model Compounds of Fast-Pyrolysis Oil," *Energy & Fuels*, 13 (1999) 1160-1166.
Masoumifard, N. et al. "Investigation of heat transfer between a horizontal tube and gas-solid fluidized bed," *International Journal of Heat and Fluid Flow*, 29:5 (2008) 1504-1511.
McLaughlin et al. 19-Hydroxybaccatin III, 10-Deacetylcephalo-Mannine, and 10-Deacetyltaxol: New Anti-Tumor Taxanes from *Taxus wallichiana*, *J of Natural Products*, 44 (1981) 312-319.
McNeil "Semisynthetic Taxol Goes on Market Amid Ongoing Quest for New Versions," *J of the National Cancer Institute*, 87:15 (1995) 1106-1108.
Meier, D. et al. "State of the art of applied fast pyrolysis of lignocellulosic materials—a review," *Bioresource Technology*, 68:1 (1999) 71-77.
Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).
Mercader, F. et al. "Pyrolysis oil upgrading by high pressure thermal treatment," *Fuel*, 89:10 (2010) 2829-2837.
Miller et al. "Antileukemic Alkaloids from *Taxus wallichiana* Zucc,*" J Org Chem*, 46 (1981) 1469-1474.
Mohan, D. et al. "Pyrolysis of Wood/Biomass for Bio-oil: A Critical Review," *Energy Fuels*, 20:3 (2006) 848-849.
Newton "Taxol: A Case Study in Natural Products Chemistry," Lecture Notes, University of Southern Maine, http:/www.usm.maine.edu/ (2009) 1-6.
Nicolaou et al. "Total Synthesis of Taxol," *Nature*, 367 (1994) 630-634.
Nowakowski, D. et al. "Potassium catalysis in the pyrolysis behaviour of short rotation willow coppice," *Fuels*, 86 (2007) 2389-2402.
Ognisty, T. P. "The direct contact heat transfer performance of a spray nozzle, a notched through distributor, and two inch Pall rings," AIChE 1990 Spring National Meeting (Orlando Mar. 18-22, 1990) Preprint N. 37c 36P, Mar. 18, 1990.
Ohman "Bed Agglomeration Characteristics during Fluidized Bed Combustion of Biomass Fuels," *Energy & Fuels*, 14 (2000) 169-178.
Okumura, Y. et al. "Pyrolysis and gasification experiments of biomass under elevated pressure condition," Nihon Kikai Gakkai Ronbunshu, B Hen/Transactions of the Japan Society of Mechanical Engineers, Part B, vol. 73, No. 7, 2007, pp. 1434-1441.
Olazar, M. et al. "Pyrolysis of Sawdust in a Conical Spouted-Bed Reactor with a HZSM-5 Catalyst," *AIChE Journal*, 46:5 (2000) 1025-1033.
Onay "Influence of pyrolysis temperature and heating rate on the production of bio-oil and char from safflower seed by pyrolysis, using a well-swept fixed-bed reactor," *Fuel Processing Technology*, 88 (2007) 523-531.
Onay, "Production of Bio-Oil from Biomass: Slow Pyrolysis of Rapeseed (*Brassica napus* L.) in a Fixed-Bed Reactor," *Energy Sources*, 25 (2003) 879-892.
Ong et al. "Pressurized hot water extraction of bioactive or marker compounds in botanicals and medicinal plant materials," *J Chromatography A*, 1112 (2006) 92-102.
Ooi, Y. S. et al. "Catalytic Cracking of Used Palm Oil and Palm Oil Fatty Acids Mixture for the Production of Liquid Fuel: Kinetic Modeling." *J Am Chem Soc*, 18 (2004) 1555-1561.
Otterstedt, J. E. et al. "Catalytic Cracking of Heavy Oils," in Occelli, Mario L. (ed) Fluid Catalytic Cracking, Chapter 17, ACS, Washington, DC (1988) 266-278.
Padmaja, K.V. et al. "Upgrading of Candelilla biocrude to hydrocarbon fuels by fluid catalytic cracking," *Biomass and Bioenergy*, 33 (2009) 1664-1669.
Pavia et al., Intro to Org Labo Techniques (1988) 3d ed. Saunders College Publishing, Washington p. 62-66, 541-587.
PCT/US2012/055384 International Search Report, dated Mar. 28, 2013, and International Preliminary Report on Patentability, dated Mar. 25, 2014.
Pecora, A.A.B. et al., "Heat transfer coefficient in a shallow fluidized bed heat exchanger with a continuous flow of solid particles," *Journal of the Brazilian Society of Mechanical Sciences and Engineering*, 28:3 (2006) 253-258.
Pecora, A.A.B., et al., "An analysis of process heat recovery in a gas-solid shallow fluidized bed," *Brazilian Journal of Chemical Engineering*, 23:4 (2006) 497-506.
Petrik, P.T. et al. "Heat exchange in condensation of R227 coolant on inclined tubes placed in a granular BED," Journal of Engineering Physics and Thermophysics, 77:4 (2004) 758-761.
Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.
Prins, Wolter et al. "Progress in fast pyrolysis technology," *Topsoe Catalysis Forum 2010*, Munkerupgaard, Denmark (Aug. 19-20, 2010).
Radlein, D. et al. "Hydrocarbons from the Catalytic Pyrolysis of Biomass," *Energy & Fuels*, 5 (1991) 760-763.
Rao "Taxol and Related Taxanes. I. Taxanes of *Taxus brevifolia* Bark," *Pharm Res* 10:4 (1993) 521-524.
Rao et al. "A New Large-Scale Process for Taxol and Related Taxanes from *Taxus brevifolia*," *Pharm Res*, 12:7 (1995) 1003-1010.
Ravindranath, G., et al., "Heat transfer studies of bare tube bundles in gas-solid fluidized bed", 9th International Symposium on Fluid Control Measurement and Visualization 2007, FLUCOME 2007, vol. 3, 2007, pp. 1361-1369.
Rodriguez, O.M.H. et al. "Heat recovery from hot solid particles in a shallow fluidized bed," *Applied Thermal Engineering*, 22:2 (2002) 145-160.
Samolada, M. C. et al. "Production of a bio-gasoline by upgrading biomass flash pyrolysis liquids via hydrogen processing and catalytic cracking," *Fuel*, 77:14 (1998) 1667-1674.
Sang "Biofuel Production from Catalytic Cracking of Palm Oil," *Energy Sources*, 25 (2003) 859-869.
Scahill, J. et al. "Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.
Scott, D. et al. Pretreatment of poplar wood for fast pyrolysis: rate of cation removal, *Journal of Analytical and Applied Pyrolysis*, 57 (2000) 169-176.
Senilh et al. "Mise en Evidence de Nouveaux Analogues du Taxol Extraits de Taxus baccata," *J of Natural Products*, 47 (1984) 131-137. (English Abstract included).
Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.
Sharma, R. K. et al. "Catalytic Upgrading of Pyrolysis Oil," *Energy & Fuels*, 7 (1993) 306-314.
Sharma, R. K. et al. "Upgrading of wood-derived bio-oil over HZSM-5," *Bioresource Technology*, 35:1 (1991) 57-66.
Smith R.M. "Extractions with superheated water," *J Chromatography A*, 975 (2002) 31-46.
Snader "Detection and Isolation," in Suffness, M. (ed) *Taxol-Science and Applications*, CRC Press, Boca Raton, Florida (1995) 277-286.

(56) References Cited

OTHER PUBLICATIONS

Srinivas, S.T. et al "Thermal and Catalytic Upgrading of a Biomass-Derived Oil in a Dual Reaction System," *Can. J. Chem. Eng.*, 78 (2009) 343-354.

Stierle et al. "The Search for Taxol-Producing Microorganism Among the Endophytic Fungi of the Pacific Yew, *Taxus brevifolia*," *J of Natural Products*, 58 (1995) 1315-1324.

Stojanovic, B. et al. "Experimental investigation of thermal conductivity coefficient and heat exchange between fluidized bed and inclined exchange surface," *Brazilian Journal of Chemical Engineering*, 26:2 (2009) 343-352.

Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).

Twaiq, A. A. et al. "Performance of composite catalysts in palm oil cracking for the production of liquid fuels and chemicals," *Fuel Processing Technology*, 85 (2004) 1283-1300.

Twaiq, F. A. et al. "Liquid hydrocarbon fuels from palm oil by catalytic cracking over aluminosilicate mesoporous catalysts with various Si/Al ratios," *Microporous and Mesoporous Materials*, 64 (2003) 95-107.

Tyson, K. et al. "Biomass Oil Analysis: Research Needs and Recommendations," National Renewable Energy Laboratory, Report No. NREL/TP-510-34796 (Jun. 2004).

Valle, B. et al. "Integration of Thermal Treatment and Catalytic Transformation for Upgrading Biomass Pyrolysis Oil," *International Journal of Chemical Reactor Engineering*, 5:1 (2007).

Vasanova, L.K. "Characteristic features of heat transfer of tube bundles in a cross water-air ftow and a three-phase ftuidized bed," *Heat Transfer Research*, 34:5-6 (2003) 414-420.

Vitolo, S. et al. "Catalytic upgrading of pyrolytic oils over HZSM-5 zeolite: behaviour of the catalyst when used in repeated upgrading—regenerating cycles," *Fuel*, 80 (2001) 17-26.

Vitolo, S. et al. "Catalytic upgrading of pyrolytic oils to fuel over different zeolites," *Fuel*, 78:10 (1999) 1147-1159.

Wang, Xianhua et al., "The Influence of Microwave Drying on Biomass Pyrolysis," *Energy & Fuels* 22 (2008) 67-74.

Westerhof, Roel J. M. et al., "Controlling the Water Content of Biomass Fast Pyrolysis Oil," *Ind. Eng. Chem. Res.* 46 (2007) 9238-9247.

Williams, Paul T. et al. "Characterisation of oils from the fluidised bed pyrolysis of biomass with zeolite catalyst upgrading," *Biomass and Bioenergy*, 7:1-6 (1994) 223-236.

Williams, Paul T. et al. "Comparison of products from the pyrolysis and catalytic pyrolysis of rice husks," *Energy*, 25:6 (2000) 493-513.

Williams, Paul T. et al. "The influence of catalyst type on the composition of upgraded biomass pyrolysis oils," *J Analytical and Applied Pyrolysis*, 31 (1995) 39-61.

Yukimune et al. "Methyl Jasmonate-induced Overproduction of Paclitaxel and Baccatin III in Taxus Cell Suspension Cultures," *Nature Biotechnology* 14 (1996) 1129-1132.

Zhang et al. "Investigation on initial stage of rapid pyrolysis at high pressure using Taiheiyo coal in dense phase," *Fuel*, 81:9 (2002) 1189-1197.

Zhang, "Hydrodynamics of a Novel Biomass Autothermal Fast Pyrolysis Reactor: Flow Pattern and Pressure Drop," *Chern. Eng. Technol.*, 32:1 (2009) 27-37.

Graham, R.G. et al. "Thermal and Catalytic Fast Pyrolysis of Lignin by Rapid Thermal Processing (RPT)," Seventh Canadian Bioenergy R&D Seminar, Skyline Hotel, Ottawa, Ontario, Canada, Apr. 24-26, 1989.

U.S. Appl. No. 15/233,560, filed Aug. 10, 2016, Currently Pending.

\* cited by examiner

APPARATUSES AND METHODS FOR CONTROLLING HEAT FOR RAPID THERMAL PROCESSING OF CARBONACEOUS MATERIAL

CROSS REFERENCE TO RELATED APPLICATIONS

This application is the National Phase application of International Application No. PCT/US2012/055384, filed Sep. 14, 2012, which designated the United States and was published in English, and which further claims priority to U.S. application Ser. No. 13/240,570 which was filed on Sep. 22, 2011. The foregoing related applications, in their entirety, are incorporated herein by reference.

FIELD OF THE INVENTION

The present invention relates generally to apparatuses and methods for thermal processing of carbonaceous material, and more particularly relates to apparatuses and methods for controlling heat for rapid thermal processing of carbonaceous material.

BACKGROUND OF THE INVENTION

The processing of carbonaceous feedstocks (e.g. biomass) to produce chemicals and/or fuels can be accomplished by fast (rapid or flash) pyrolysis. Fast pyrolysis is a generic term that encompasses various methods of rapidly imparting a relatively high temperature to feedstocks for a very short time, and then rapidly reducing the temperature of the primary products before chemical equilibrium can occur. Using this approach, the complex structures of carbonaceous feedstocks are broken into reactive chemical fragments, which are initially formed by depolymerization and volatilization reactions. The non-equilibrium products are then preserved by rapidly reducing the temperature.

More recently, a rapid thermal process (RTP) has been developed for carrying out fast pyrolysis of carbonaceous material. The RTP utilizes an upflow transport reactor and reheater arrangement, and makes use of an inert inorganic solid particulate heat carrier (e.g. typically sand) to carry and transfer heat in the process. The RTP reactor provides an extremely rapid heating rate and excellent particle ablation of the carbonaceous material, which is particularly well-suited for processing of biomass, as a result of direct turbulent contact between the heated inorganic solid particulates and the carbonaceous material as they are mixed together and travel upward through the reactor. In particular, the heated inorganic solid particulates transfer heat to pyrolyze the carbonaceous material forming char and gaseous products including high quality pyrolysis gas, which are removed from the reactor to a cyclone. The cyclone separates the gaseous products and solids (e.g. inorganic solid particulates and char), and the solids are passed to the reheater.

The reheater is a vessel that burns the char into ash and reheats the inorganic solid particulates, which are then returned to the reactor for pyrolyzing more carbonaceous material. An oxygen-containing gas, typically air, is supplied to the reheater for burning the char. The inorganic solid particulates and char are contained in the lower portion of the reheater and are fluidized by the air, forming a fluidized bubbling bed also referred to as the dense phase. The reheater also has a dilute phase that is above the dense phase and comprises primarily flue gas, entrained inorganic particles, and ash, which are the byproducts formed from combusting the char with the air. The flue gas, entrained inorganic particles, and ash are removed from the reheater to a cyclone which separates the solids from the flue gas.

Currently, higher capacity RTP arrangements are desired that are capable of handling carbonaceous feedstock rates of up to 400 bone dry metric tons per day (BDMTPD) or higher compared to previously lower feedstock rates of less than 100 BDMTPD. The increased capacity results in more char being produced in the RTP reactor, and the RTP reheater and auxiliary equipment (e.g. cyclone, air blower, etc.) need to be larger in size to support the increased feedstock rate. In particular, many newer RTP reheaters require additional volume to accommodate additional air supplied to the reheaters for cooling to control the otherwise rising temperatures from burning the additional char, and can have sizes of up to 12 meters (m) or greater in diameter and heights of up to 25 m or greater. Unfortunately, the larger sizes of these reheaters substantially increase the cost and complexity of shipping, installing, and operating the reheaters.

Accordingly, it is desirable to provide apparatuses and methods for controlling heat for rapid thermal processing that can adequately support higher carbonaceous feedstock rates without exceeding the design temperature of the reheater from burning the additional char. Moreover, it is also desirable to provide apparatuses and methods for controlling heat for rapid thermal processing without substantially increasing the cost and complexity of shipping, installing, and operating the reheaters. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Apparatuses and methods for controlling heat for rapid thermal processing of carbonaceous material are provided herein. In accordance with an exemplary embodiment, an apparatus for controlling heat for rapid thermal processing of carbonaceous material comprises a reheater configured to contain a fluidized bubbling bed that comprises an oxygen-containing gas, inorganic heat carrier particles, and char and to operate at combustion conditions effective to burn the char into ash and heat the inorganic heat carrier particles to form heated inorganic particles. An inorganic particle cooler is in fluid communication with the reheater to receive a first portion of the heated inorganic particles and is configured to receive a cooling medium for indirect heat exchange with the first portion of the heated inorganic particles to form first partially-cooled heated inorganic particles. The reheater and the inorganic particle cooler are cooperatively configured to combine the first partially-cooled heated inorganic particles with a second portion of the heated inorganic particles in the reheater to form second partially-cooled heated inorganic particles. A reactor is in fluid communication with the reheater to receive the second partially-cooled heated inorganic particles.

In accordance with another exemplary embodiment, an apparatus for controlling heat for rapid thermal processing of carbonaceous material is provided. The apparatus comprises a reactor and a reheater that is in fluid communication with the reactor to receive inorganic heat carrier particles and char. The reheater is configured to form a fluidized bubbling bed that comprises an oxygen-containing gas, the inorganic heat carrier particles, and the char and to operate at combustion conditions effective to burn the char into ash and heat the inorganic heat carrier particles to form heated inorganic particles. An inorganic particle cooler is in fluid communication with the reheater and comprises a shell portion and a tube portion that is disposed in the shell portion. The inorganic particle cooler is configured such that the tube portion receives a portion of the heated inorganic particles and the shell portion receives a cooling medium for indirect heat exchange with the portion of the heated inorganic particles to form partially-cooled heated inorganic particles that are fluidly communicated to the reheater.

In accordance with another exemplary embodiment, a method for controlling heat for rapid thermal processing of carbonaceous material is provided. The method comprises the steps of combining an oxygen-containing gas, inorganic heat carrier particles, and char at combustion conditions effective to burn the char into ash and heat the inorganic heat carrier particles to form heated inorganic particles. Heat from a first portion of the heated inorganic particles is indirectly exchanged to a cooling medium to form first partially-cooled heated inorganic particles. The first partially-cooled heated inorganic particles are combined with a second portion of the heated inorganic particles to form second partially-cooled heated inorganic particles.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding Background of the Invention or the following Detailed Description.

Various embodiments contemplated herein relate to apparatuses and methods for controlling heat for rapid thermal processing of carbonaceous material. Unlike the prior art, the exemplary embodiments taught herein provide an apparatus comprising a reactor, a reheater that is in fluid communication with the reactor, and an inorganic particle cooler that is in fluid communication with the reheater. The reactor rapidly pyrolyzes a carbonaceous feedstock with heated inorganic particles to form gaseous products and solids that include cooled inorganic heat carrier particles and char. A cyclone separates the gaseous products from the solids. The reheater receives the solids and fluidizes the cooled inorganic heat carrier particles and char with an oxygen-containing gas to form a fluidized bubbling bed. The reheater is operating at combustion conditions effective to burn the char into ash and reheat the cooled inorganic heat carrier particles to form heated inorganic particles.

In an exemplary embodiment, a portion of the heated inorganic particles and a cooling medium are fluidly communicated to the inorganic particle cooler. Some of the heat from the heated inorganic particles is indirectly exchanged with the cooling medium to partially cool the heated inorganic particles, forming a heated cooling medium and first partially-cooled heated inorganic particles. The heated cooling medium is removed from the inorganic particle cooler. The first partially-cooled heated inorganic particles are fluidly communicated to the reheater and combined with the remaining portion of the heated inorganic particles to partially cool the heated inorganic particles, forming second partially-cooled heated inorganic particles. The second partially-cooled heated inorganic particles are fluidly communicated to the reactor for continued rapid pyrolysis of the carbonaceous feedstock. The inventors have found that partially cooling the heated inorganic particles with the inorganic particle cooler facilitates controlling the temperatures from excessively rising in the reheater even if the fluidized bubbling bed contains higher levels of char. Accordingly, the reheater does not require additional volume that would otherwise be needed to accommodate additional air for cooling to control the reheater temperatures and therefore, the cost and complexity of shipping, installing, and operating the reheater is not substantially impacted.

Figure 1:
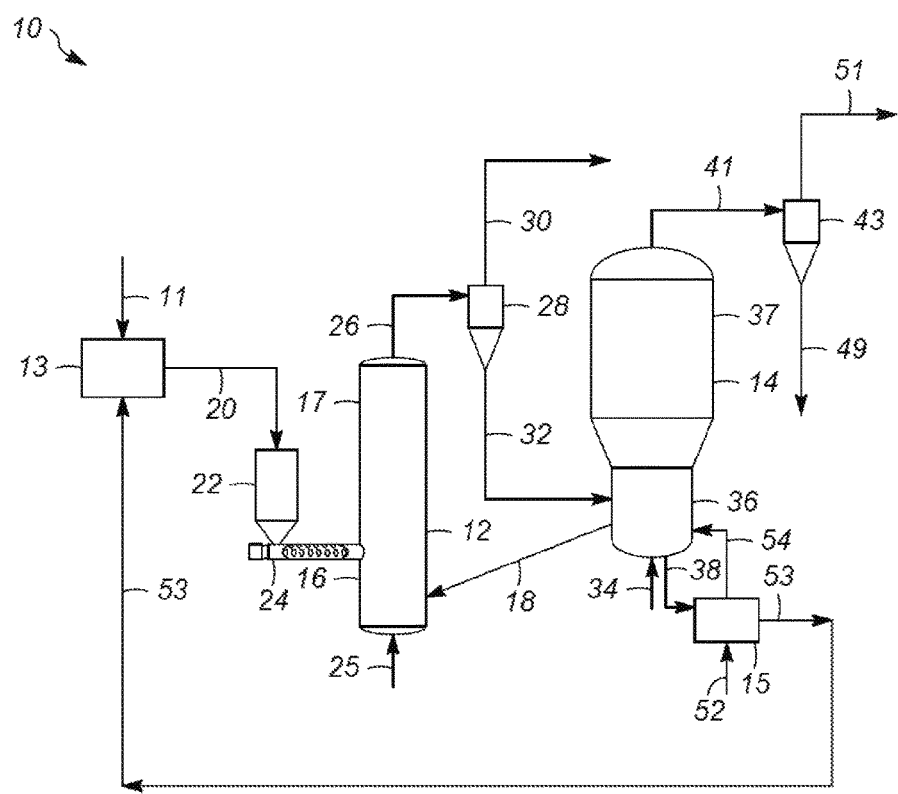
FIG. 1 schematically illustrates an apparatus for rapid thermal processing of carbonaceous material in accordance with an exemplary embodiment.

Referring to FIG. 1, a schematic depiction of an apparatus 10 for rapid thermal processing of a carbonaceous material in accordance with an exemplary embodiment is provided. The apparatus 10 comprises an upflow transport reactor 12, a reheater 14, and an inorganic particle cooler 15. The reactor 12 is configured for achieving a relatively high temperature within a minimum amount of time as well as providing a relatively short residence time at the high temperature to affect fast pyrolysis of a carbonaceous feedstock 20 (e.g. biomass including biomass waste). The relatively high temperature is achieved in a lower portion 16 of the reactor 12 using heated inorganic heat carrier particles 18 (e.g., heated sand) that are supplied from the reheater 14 to drive the pyrolysis process.

As illustrated and will be discussed in further detail below, a dryer 13 removes water from a moisture-containing carbonaceous feedstock 11 to form a carbonaceous feedstock 20 that preferably has a moisture content of 6 weight percent (wt. %) or less. The carbonaceous feedstock 20 is supplied to a feed bin 22 where a reactor feed conveyor 24 introduces the carbonaceous feedstock 20 to the lower portion 16 of the reactor 12. A carrier gas 25, which can be a recirculation gas collected from a suitable location along the apparatus 10, is also introduced to the lower portion 16 of the reactor 12. The carrier gas 25 preferably contains less than 1 wt. % of oxygen, and more preferably, less than 0.5 wt. % of oxygen so that there is very little or no oxygen present thus minimizing or preventing oxidation and/or combustion of the carbonaceous feedstock 20 in the reactor 12.

Rapid mixing of the heated inorganic heat carrier particles 18 and the carbonaceous feedstock 20 occur in the lower portion 16 of the reactor 12. As the mixture advances up the reactor 12 in turbulent flow with the carrier gas 25, heat is transferred from the heated inorganic heat carrier particles 18 to the carbonaceous feedstock 20. In an exemplary embodiment, mixing and rapid heat transfer occurs within 10% of the desired overall reactor resident time. Accordingly, the mixing time is preferably less than 0.1 seconds, and more preferably within 0.015 to 0.030 seconds. In an exemplary embodiment, the temperature in the lower portion 16 of the reactor 12 is from 600 to 780° C., and the heating rate of the carbonaceous feedstock 20 is preferably 1000° C. per second or greater. The use of sand or other suitable inorganic particulate as a solid heat carrier enhances the heat transfer because of the higher heat carrying capacity of the inorganic particles, and the ability of the inorganic particles to mechanically ablate the surface of the reacting carbonaceous material.

As the heated mixture is carried towards an upper portion 17 of the reactor 12 with the carrier gas 25, fast pyrolysis of the carbonaceous feedstock 20 occurs. In an exemplary embodiment, the temperature in the upper portion 17 of the reactor 12 is from 450 to 600° C. The sand or other inorganic heat carrier particles and the carrier gas 25, along with product vapors 30 and char form a product stream 26 that is carried out of the upper portion 17 of the reactor 12 to a cyclone 28. The cyclone 28, preferably a reverse flow cyclone, removes the solids 32, e.g., sand and char, from the product vapors 30, which comprise the carrier gas 25, non-condensible product gases and the primary condensible vapor products. The product vapors 30 are removed from the cyclone 28 and passed to a Quench Tower (not shown), for example, for rapid cooling or quenching to preserve the yields of the valuable non-equilibrium products in the product vapors 30. The solids 32 are removed from the cyclone 28 and passed to the reheater 14.

The reheater 14 receives an oxygen-containing gas 34, which is typically air. The solids 32 are contained in a lower portion 36 of the reheater 14 and are fluidized by the oxygen-containing gas 34 from a gas distributor 86 (see FIG. 2) to form a fluidized bubbling bed of char, inorganic heat carrier particles, and the oxygen-containing gas 34. The reheater 14 is operating at combustion conditions to burn the char into ash and flue gas. The energy released from combustion of the char reheats the inorganic heat carrier particles to form heated inorganic particles. In an exemplary embodiment, the heated inorganic particles have a temperature of from 600 to 780° C.

The flue gas, entrained sand, and ash rise to an upper portion 37 of the reheater 14 and are carried out of the reheater 14 as an exhaust stream 41 to a cyclone 43. The cyclone 43, preferably a reverse flow cyclone, removes the sand and ash from the flue gas.

The flue gas is passed along as a gas stream 51 for exhausting, subsequent processing, recirculation, or a combination thereof, and the sand and ash are passed along as a solids-containing stream 49 for disposal or subsequent processing.

Figure 2:
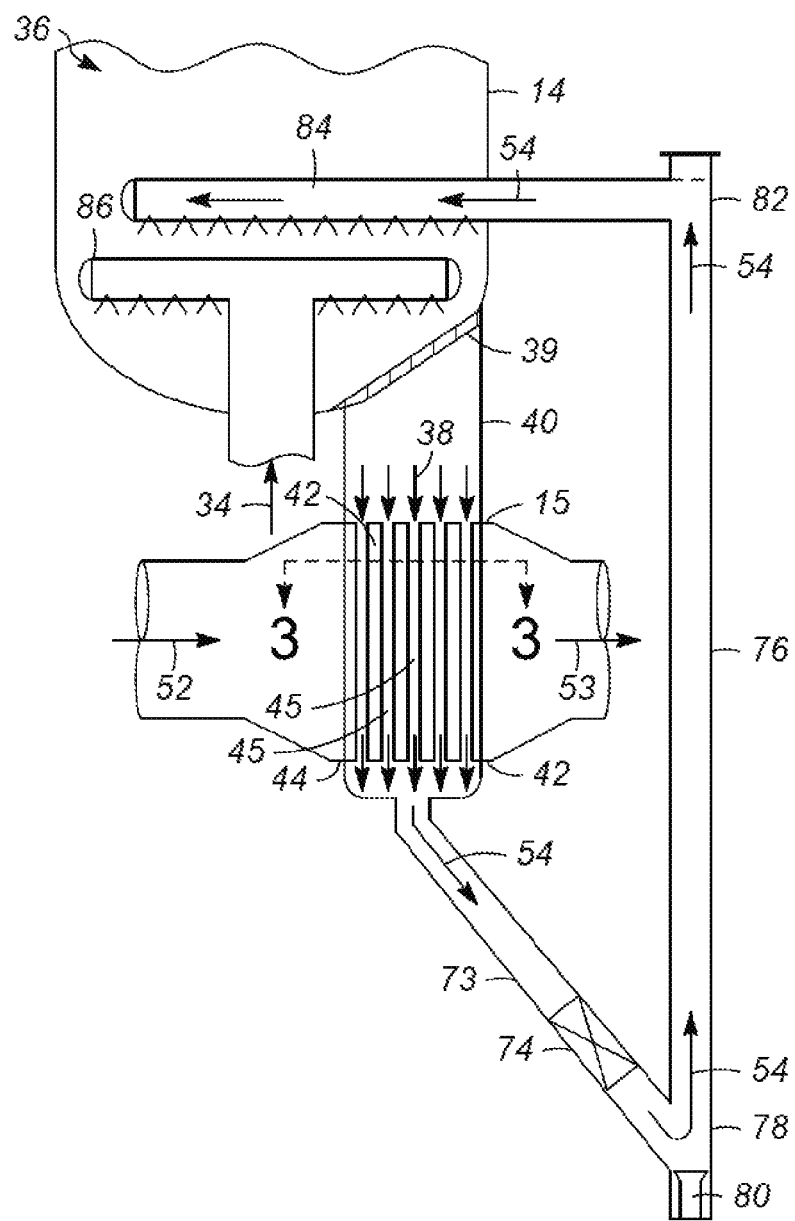
FIG. 2 is a partial sectional view of the apparatus depicted in FIG. 1 including an inorganic particle cooler in accordance with an exemplary embodiment.

Referring also to FIG. 2, in an exemplary embodiment, a portion of heated inorganic particles 38 is removed from the reheater 14 and introduced to the inorganic particle cooler 15. As illustrated, the portion of heated inorganic particles 38 is removed from the lower portion 36 of the reheater 14 and passed along a cooler inlet pipe 40 through at least one bubble breaking grating 39 to an exchanger vessel 42. The bubble breaking grating 39 breaks up any larger air-bubbles, for example, from the fluidized inorganic particles that otherwise may be passed along countercurrent to the portion of heated inorganic particles 38, back up to the bubbling bed at the lower portion 36 of the reheater 14. Big bubbles in the fluidized bed affect the reheater's 14 performance and solid entrainment. The bubble breaking grating 39 also serves as a screener to prevent bigger chunks of material, such as refractory from directly blocking or plugging the tube portion 45 and reducing the inorganic particle cooler capacity.

In an exemplary embodiment, the exchanger vessel 42 is configured as a heat exchanger and comprises a shell portion 44 and a tube portion 45 that is disposed in the shell portion 44. The portion of the heated inorganic particles 38 is passed through the tube portion 45. The shell portion 44 of the exchanger vessel 42 receives a cooling medium 52 for indirect heat exchange with the portion of heated inorganic particles 38 passing through the tube portion 45 to form partially-cooled heated inorganic particles 54 and a heated cooling medium 53. In an exemplary embodiment, the partially-cooled heated inorganic particles 54 have a temperature of from 500 to 680° C.

Preferably, the cooling medium 52 comprises air and the heated cooling medium 53 comprises heated air. As illustrated in FIG. 1, the heated cooling medium 53 (e.g. heated air) may be passed along to the dryer 13 for removing water from the moisture-containing carbonaceous feedstock 11. Alternatively, the cooling medium 52 may be any other thermally conductive fluid known to those skilled in the art. Preferably, the cooling medium 52 has a temperature of 40° C. or less, and the heated cooling medium 53 has a temperature of 125° C. or greater.

Figure 3:
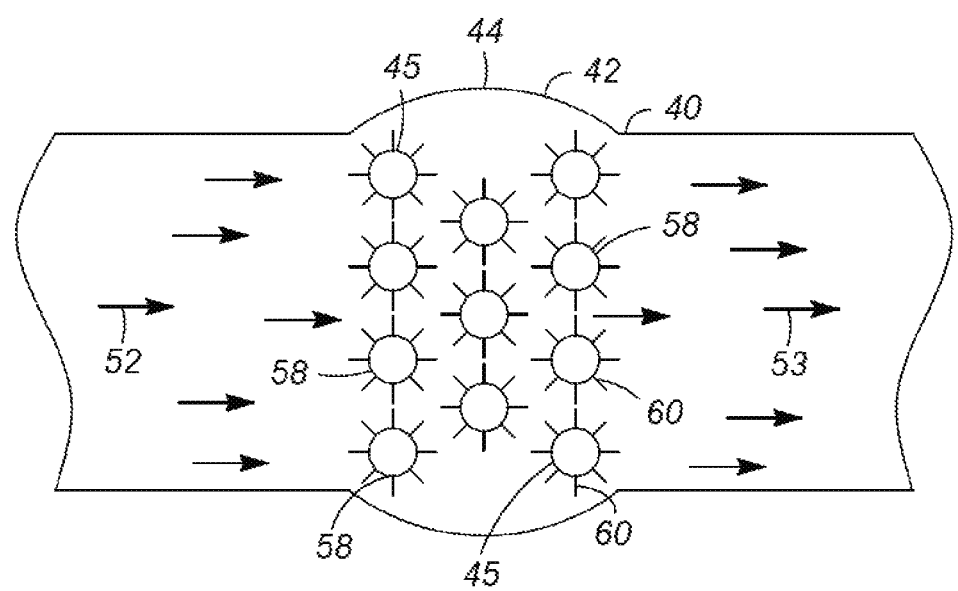
FIG. 3 is a sectional view of the inorganic particle cooler depicted in FIG. 2 along line 3-3.

Referring to FIG. 3, in an exemplary embodiment, the tube portion 45 comprises a plurality of tubes 58 that are juxtaposed, spaced apart, and longitudinally disposed substantially parallel to a vertical axis. Each of the tubes 58 has an outer surface with one or more cooling fins 60 that can extend, for example, radially or longitudinally outward from the outer surface. The cooling fins 60 facilitate indirect heat exchange between the portion of the heated inorganic particles 38 advancing through the tube portion 45 and the cooling medium 52 advancing through the shell portion 44.

As illustrated in FIG. 2, the partially-cooled heated inorganic particles 54 are removed from the exchanger vessel 42 and passed along a cooler standpipe 73. The cooler standpipe 73 has an expansion joint-slide valve 74 for controlling the flow rate of the partially-cooled heated inorganic particles 54. A lift riser 76 is downstream from the exchanger vessel 42 and is fluidly coupled to the cooler standpipe 73 for receiving the partially-cooled heated inorganic particles 54. Disposed in a lower portion 78 of the lift riser 76 is an air nozzle 80 that is configured to direct the partially-cooled heated inorganic particles 54 through the lift riser 76 to an upper portion 82 of the lift riser 76.

A sand-air distributor 84 is disposed in the reheater 14 and is fluidly coupled to the lift-riser 76 to receive the partially-cooled heated inorganic particles 54. The sand-air distributor 84 is configured to distribute the partially-cooled heated inorganic particles 54 in the reheater 14, preferably above the gas distributor 86, to partially cool the remaining portion of the heated inorganic particles and form the heated inorganic heat carrier particles 18. Referring also to FIG. 1, in exemplary embodiment, the heated inorganic heat carrier particles 18 have a temperature of from 600 to 780° C. and are passed along to the reactor 12 for rapidly pyrolyzing additional carbonaceous material.

Accordingly, apparatuses and methods for controlling heat for rapid thermal processing of carbonaceous material have been described. Unlike the prior art, the exemplary embodiments taught herein provide an apparatus comprising a reactor, a reheater, and an inorganic particle cooler. The reactor rapidly pyrolyzes a carbonaceous feedstock with heated inorganic particles to form pyrolysis oil and solids that include cooled inorganic heat carrier particles and char. The reheater receives the solids and fluidizes the cooled inorganic heat carrier particles and char with an oxygen-containing gas to form a fluidized bubbling bed. The reheater is operating at combustion conditions effective to burn the char into ash and heat the cooled inorganic heat carrier particles to form heated inorganic particles. The inorganic particle cooler receives a portion of the heated inorganic particles and removes some of the heat via indirect exchange to form partially-cooled heated inorganic particles that are combined with the remaining portion of the heated inorganic particles to partially cool the heated inorganic particles. It has been found that partially cooling the heated inorganic particles with the inorganic particle cooler facilitates controlling the temperatures from excessively rising in the reheater even if the fluidized bubbling bed contains higher levels of char. Accordingly, the reheater does not require additional volume that would otherwise be needed to accommodate additional air for cooling to control the reheater temperatures and therefore, the cost and complexity of shipping, installing, and operating the reheater is not substantially impacted.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A method for controlling heat for rapid thermal processing of carbonaceous material, comprising:
   i) combining char obtained from a rapid thermal processing unit with inorganic particles and an oxygen-containing gas in a reheater at combustion conditions effective to burn the char into ash and heat the inorganic particles to form heated inorganic particles;
   ii) drying a moisture-containing carbonaceous feedstock to form a reduced-moisture carbonaceous feedstock, comprising:
      a) contacting an air stream and a first portion of the heated inorganic particles to form a heated air stream; and
      b) transferring heat to the moisture-containing carbonaceous feedstock, comprising: contacting the heated air stream with the moisture-containing carbonaceous feedstock; and
   iii) pyrolyzing the reduced-moisture carbonaceous feedstock in the rapid thermal processing unit, comprising: adding heat to the reduced-moisture carbonaceous feedstock in the rapid thermal processing unit, wherein the heat in the drying and the heat in the pyrolyzing consist of heat derived from the combustion of the char obtained from the rapid thermal processing unit.

2. The method of claim 1, wherein the moisture-containing carbonaceous feedstock is a biomass.

3. The method of claim 1, wherein the reduced-moisture carbonaceous feedstock has a water content of 6 wt. % or less.

4. The method of claim 1, wherein the contacting the air stream and the first portion of the heated inorganic particles comprises: introducing the first portion of the heated inorganic particles and the air stream into a heat exchanger.

5. The method of claim 4, said pyrolyzing comprising: introducing the reduced-moisture carbonaceous feedstock to a lower portion of the rapid thermal processing unit, wherein the rapid thermal processing unit is a fast pyrolysis upflow reactor.

6. The method of claim 4, wherein the contacting the air stream and the first portion of the heated inorganic particles further forms first partially-cooled heated inorganic particles, and said first partially-cooled heated inorganic particles are recirculated from the heat exchanger into the reheater and combined with a second portion of the heated inorganic particles in the reheater to form second partially-cooled heated inorganic particles, and the second partially-cooled heated inorganic particles are communicated from the reheater to said lower portion of the rapid thermal processing unit.

7. The method of claim 4, wherein the contacting the air stream and the first portion of the heated inorganic particles further forms first partially-cooled heated inorganic particles, and said first portion of the heated inorganic particles enter the heat exchanger at a temperature of between 600° C. and 780° C. and said first partially-cooled heated inorganic particles exit the heat exchanger at a temperature of between 500° C. and 680° C.

8. The method of claim 7, wherein said first portion of heated inorganic particles are recirculated from the heat exchanger into the reheater and combined with a second portion of the heated inorganic particles in the reheater to form second partially-cooled heated inorganic particles, and the second partially-cooled heated inorganic particles are communicated from the reheater to said lower portion of the reactor.

9. The method of claim 1, wherein the heated air stream is at a temperature of at least 125° C.

10. The method of claim 1, wherein the air stream is at a temperature of 40° C. or less.

11. The method of claim 1, said pyrolyzing comprising: introducing the reduced-moisture carbonaceous feedstock to a lower portion of the rapid thermal processing unit, wherein the rapid thermal processing unit is a fast pyrolysis upflow reactor.

12. The method of claim 11, wherein the lower portion of the reactor is at a temperature of between 600° C. and 780° C.

13. The method of claim 11, wherein an upper portion of the reactor is maintained at a temperature of between 450° C. and 600° C.

14. The method of claim 11, wherein said first portion of heated inorganic particles are recirculated from the heat exchanger into the reheater and combined with a second portion of the heated inorganic particles in the reheater to form second partially-cooled heated inorganic particles, wherein said introducing comprises: mixing the reduced-moisture carbonaceous feedstock with the second partially-cooled heated inorganic particles in a low-oxygen carrier gas, said second partially-cooled heated inorganic particles at an initial temperature of between 600° C. and 780° C.

15. The method of claim 14, wherein the mixing occurs under turbulent flow conditions.

16. The method of claim 15, wherein the mixing has a mixing time of less than 0.1 seconds.

17. The method of claim 15, wherein the mixing occurs within 10% of a desired reactor residence time.

18. The method of claim 14, wherein said reduced-moisture carbonaceous feedstock is heated at a rate of greater than 1000° C. per second in said lower portion of the reactor.

19. The method of claim 14, wherein the low oxygen carrier gas has an oxygen content of less than 1 wt. %.

20. The method of claim 1, wherein up to 400 bone dry metric tons per day of reduced-moisture carbonaceous feedstock are pyrolyzed.

* * * * *